(12) United States Patent
Simonin et al.

(10) Patent No.: US 11,414,137 B2
(45) Date of Patent: Aug. 16, 2022

(54) VEHICLE PARTITION AND METHOD OF MANUFACTURING A VEHICLE

(71) Applicant: GM GLOBAL TECHNOLOGY OPERATIONS LLC, Detroit, MI (US)

(72) Inventors: Matthew Simonin, Ortonville, MI (US); John D. Taylor, Royal Oak, MI (US); Michael T. Chaney, Macomb, MI (US); James Nicholas, Macomb, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 337 days.

(21) Appl. No.: 16/788,837

(22) Filed: Feb. 12, 2020

(65) Prior Publication Data
US 2021/0245819 A1    Aug. 12, 2021

(51) Int. Cl.
*B62D 33/02* (2006.01)
*B60R 21/02* (2006.01)
*B62D 33/06* (2006.01)

(52) U.S. Cl.
CPC ............ *B62D 33/02* (2013.01); *B60R 21/026* (2013.01); *B62D 33/06* (2013.01)

(58) Field of Classification Search
CPC ....... B60R 21/06; B60R 21/026; B62D 33/02; B60J 1/1853; B60J 1/1861
USPC ......................................... 296/24.43, 146.16
See application file for complete search history.

(56) References Cited

U.S. PATENT DOCUMENTS

| | | | | |
|---|---|---|---|---|
| 4,119,341 A * | 10/1978 | Cook | ..................... | B62D 33/06 296/146.16 |
| 4,793,099 A * | 12/1988 | Friese | ..................... | B60J 1/1861 49/362 |
| 6,260,905 B1 * | 7/2001 | Wagner | .................. | B60J 1/1861 49/374 |
| 6,260,916 B1 * | 7/2001 | Hunt | ..................... | B62D 47/003 296/183.1 |
| 6,422,638 B1 * | 7/2002 | Carnaghi | ............... | B60J 1/1853 49/374 |
| 6,447,039 B1 * | 9/2002 | Song | ........................ | B60P 3/40 296/100.07 |
| 6,513,863 B1 * | 2/2003 | Renke | ..................... | B60P 3/423 296/57.1 |
| 6,742,834 B1 * | 6/2004 | Merritt | ................. | B60N 2/3011 296/26.11 |
| 6,786,535 B1 * | 9/2004 | Grzegorzewski | .... | B60N 2/3013 296/37.16 |
| 6,796,600 B1 * | 9/2004 | Ferer | ...................... | B60P 3/423 296/37.6 |
| 6,837,529 B2 * | 1/2005 | Kharod | .................. | B60J 1/1853 296/183.1 |

(Continued)

*Primary Examiner* — Jason S Morrow
(74) *Attorney, Agent, or Firm* — Quinn IP Law

(57) ABSTRACT

A partition separates a cabin space from a bed space on a vehicle having a first side body and a second side body. The partition includes a forward-opening receptacle fixable to the first side body and to the second side body to span between the first side body and the second side body and includes a rear panel. The partition includes a modular assembly securable as a unit to a forward side of the receptacle. The modular assembly includes a front panel and a window glass configured to be translatably supported by the modular assembly between the front panel and the rear panel.

17 Claims, 8 Drawing Sheets

(56) References Cited

U.S. PATENT DOCUMENTS

| | | | | |
|---|---|---|---|---|
| 8,246,101 | B2* | 8/2012 | Cicala | B60J 1/1861 |
| | | | | 296/146.16 |
| 9,592,611 | B2* | 3/2017 | Asamizu | B25J 15/0061 |
| 10,350,972 | B2* | 7/2019 | Azzouz | B62D 33/02 |
| 10,479,420 | B2* | 11/2019 | Staser | B60J 1/18 |
| 2005/0184557 | A1* | 8/2005 | Suzuki | B60J 1/1861 |
| | | | | 296/146.16 |
| 2022/0055697 | A1* | 2/2022 | Morgans | B62D 33/077 |

* cited by examiner

VEHICLE PARTITION AND METHOD OF MANUFACTURING A VEHICLE

INTRODUCTION

In a vehicle body construction referred to as body-frame-integral, body panels are shaped and constructed to also serve the functions of frame components, providing structural rigidity and strength. In contrast, in a body-on-frame construction, frame components are separate from the body panels, and the body panels are mounted to the frame components.

Some vehicles, such as pickup trucks, have a cabin space in which a driver and passengers are seated during vehicle operation, and also have a bed space typically rearward of the cabin space. The bed space is often used to support and carry cargo, and may be open to the environment or covered by a tonneau cover.

SUMMARY

A partition structure divides a vehicle cabin space and a vehicle bed space, such as in a pickup truck, to enclose the cabin space. During the assembly of a body-on-frame vehicle, this vehicle structure may be secured to the frame when securing body panels to the frame. In a body-frame-integral vehicle, the cabin space and bed space may already be partially enclosed by the integral body/frame panels when a partition is to be installed. It may be desirable to complete vehicle assembly without the need for a human to enter the cabin space or the bed space.

Accordingly, a partition for a vehicle provided herein is configured with a module that may be installed from outside of the vehicle to divide the cabin space from the vehicle space. Moreover, the module serves many functions, such as cabin space venting, drop glass window support, load management, and transition between wet and dry spaces.

More specifically, a partition is provided for separating a cabin space from a bed space on a vehicle having a first side body and a second side body. The partition includes a forward-opening receptacle fixable to the first side body and to the second side body to span between the first side body and the second side body. The receptacle includes a rear panel. The partition includes a modular assembly securable as a unit to a forward side of the receptacle. The modular assembly includes a front panel and a window glass configured to be translatably supported by the modular assembly between the front panel and the rear panel. The partition may have features for water management, load management, cabin pressure venting, electronic module mounting, and may cooperate with the vehicle side bodies to create wet/dry transition zones as discussed herein.

Similarly, a vehicle disclosed herein includes a vehicle body defining a cabin space and a bed space. The vehicle body has a first side body and an opposing second side body. The side bodies are spaced apart from one another and define opposing sides of the cabin space and the bed space. A partition extends transversely (e.g., laterally) across the vehicle from the first side body to the second side body between the cabin space and the bed space. The partition includes a forward-opening receptacle fixed to and spanning between the first side body and the second side body and including a rear panel. The partition includes a modular assembly secured as a unit to a forward side of the receptacle, the modular assembly including a front panel and a window glass translatably supported by the modular assembly between the front panel and the rear panel.

A method of assembling a vehicle includes fixing a forward-opening receptacle to a first side body and to a second side body between a cabin space and a bed space, the forward-opening receptacle including a rear panel. The method includes moving a modular assembly into the cabin space forward of the receptacle while supporting the modular assembly from outside of the vehicle. The method further includes securing the modular assembly as a unit to the receptacle from outside of the vehicle, the modular assembly including a front panel and a window glass configured to be translatably supported by the modular assembly between the front panel and the rear panel. The receptacle and the modular assembly together serve as a partition between the cabin space and the bed space.

The above features and advantages and other features and advantages of the present disclosure are readily apparent from the following detailed description of the best modes for carrying out the disclosure when taken in connection with the accompanying drawings.

DETAILED DESCRIPTION

Figure 1:
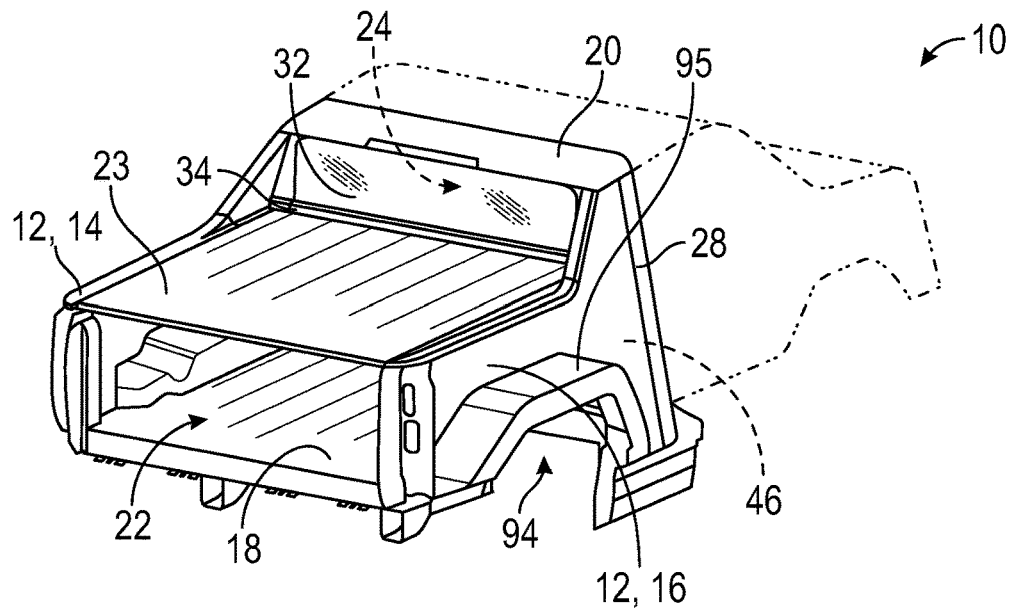
FIG. 1 is a perspective rear view of a vehicle configured as a pickup truck with a tonneau cover.

FIG. 1 shows a rear portion of a vehicle 10 constructed with a body-frame-integral vehicle body 12, only portions of which are shown. For example, some exterior body panels that may be referred to as Class A surfaces are not shown in FIG. 1, and a front portion of the body 12 is not shown. The body 12 includes a first side body 14 and an opposing second side body 16, as well as a cargo floor 18 and a roof 20. The first side body 14 and second side body 16 are spaced apart from one another generally by a width of the cargo floor 18. The side bodies 14, 16 together with the cargo floor 18 define a bed space 22 above the cargo floor 18 and between the side bodies 14, 16. A tailgate (not shown) closes the rear of the bed space 22. A removable tonneau cover 23 is shown supported in part by the side bodies 14, 16 in FIG. 1 and removed in FIG. 2.

Figure 8:
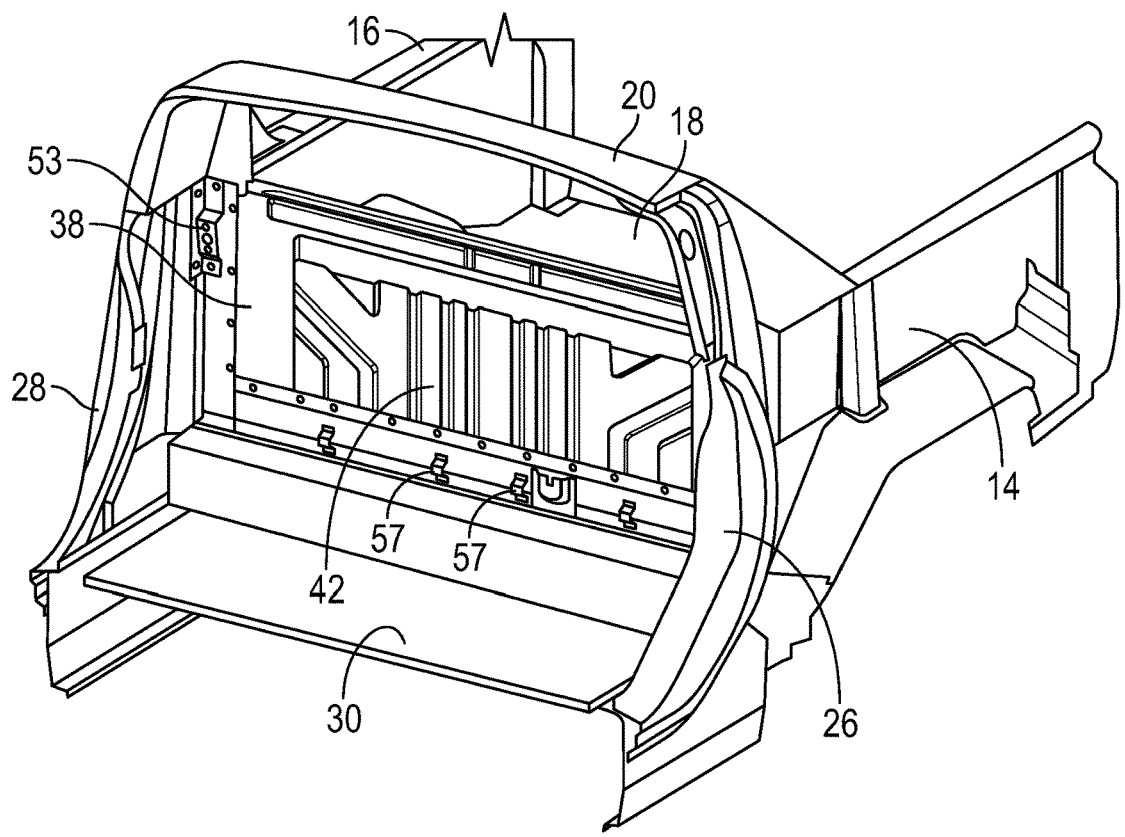
FIG. 8 is a perspective front view of a portion of the vehicle of FIG. 1 showing the forward-opening receptacle fixed to side bodies of the vehicle.

A cabin space 24 is defined forward of the bed space 22 between opposing front side bodies 26, 28 (portions of which are shown in FIG. 8), below the roof 20 (an inner panel portion of which is shown in FIG. 8), and above a passenger floor 30 (a portion of which is shown in FIG. 8). The cabin space 24 is further enclosed by a firewall structure (not shown) separating the cabin space from an engine compartment, and by closure panels and/or doors secured to the front side bodies 26, 28.

As shown in FIG. 1, the vehicle 10 is equipped with a drop glass window 32 (also referred to herein as window glass 32) at the rear of the cabin space 24. In order to enable efficient manufacturing of the body-frame-integral vehicle 10, a vehicle partition 34 that includes the drop glass window 32 extends transversely across the vehicle 10 from the first side body 14 to the second side body 16 between the cabin space 24 and the bed space 22 to separate the cabin space 24 from the bed space 22 while supporting the drop glass window 32. The vehicle partition 34 is only partly visible in FIGS. 1 and 2 and is best shown in its entirety in FIGS. 3 and 7. As further explained herein, the partition 34 includes a modular assembly 40 that can be installed from outside of the vehicle 10 (e.g., without a need for humans to enter the cabin space 24 or the bed space 22 during installation).

Figure 3:
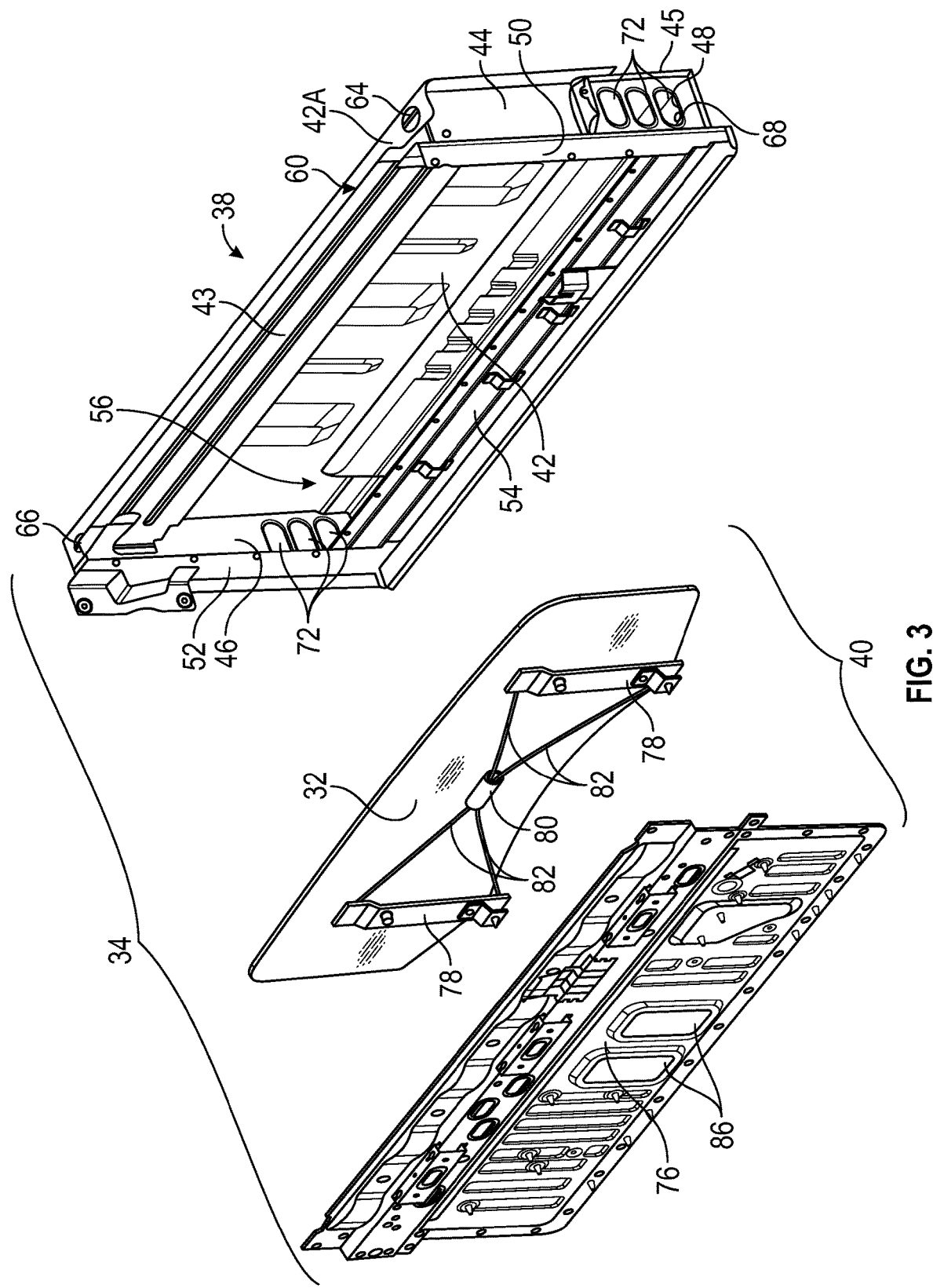
FIG. 3 is an exploded view of the partition.

Referring to FIG. 3, the vehicle partition 34 is shown in exploded view, including a forward-opening receptacle 38 and a modular assembly 40. The receptacle 38 is fixable to the first side body 14 and the second side body 16 to span between the first side body 14 and the second side body 16 (as shown in FIG. 8). The receptacle 38 includes a rear panel 42, a first side panel 44 that extends forward from the rear panel 42 near a first side edge 45 of the rear panel 42, and a second side panel 46 that extends forward from the rear panel near an opposing second side edge 47 (see FIG. 6) of the rear panel. The receptacle further includes a bottom panel 48 (only partially visible in FIG. 3) extending forward from the rear panel 42 from the first side panel 44 to the second side panel 46. Vertically-extending mounts 50, 52 extend inward from front edges of the side panels 44, 46, respectively. Corner brackets 53 (best shown in FIG. 4) are secured to the mounts 50, 52 near upper extents of the mounts 50, 52. A horizontally-extending mount 54 extends along a front of the bottom panel 48 and is secured to the side mounts 50, 52. The receptacle thus forms a slot-like cavity 56 rearward of the mounts 50, 52, 54, above the bottom panel 48 and forward of the rear panel 42. The slot-like cavity 56 is generally open in the forward direction, so that the receptacle 38 is referred to as forward-opening.

Figure 4:
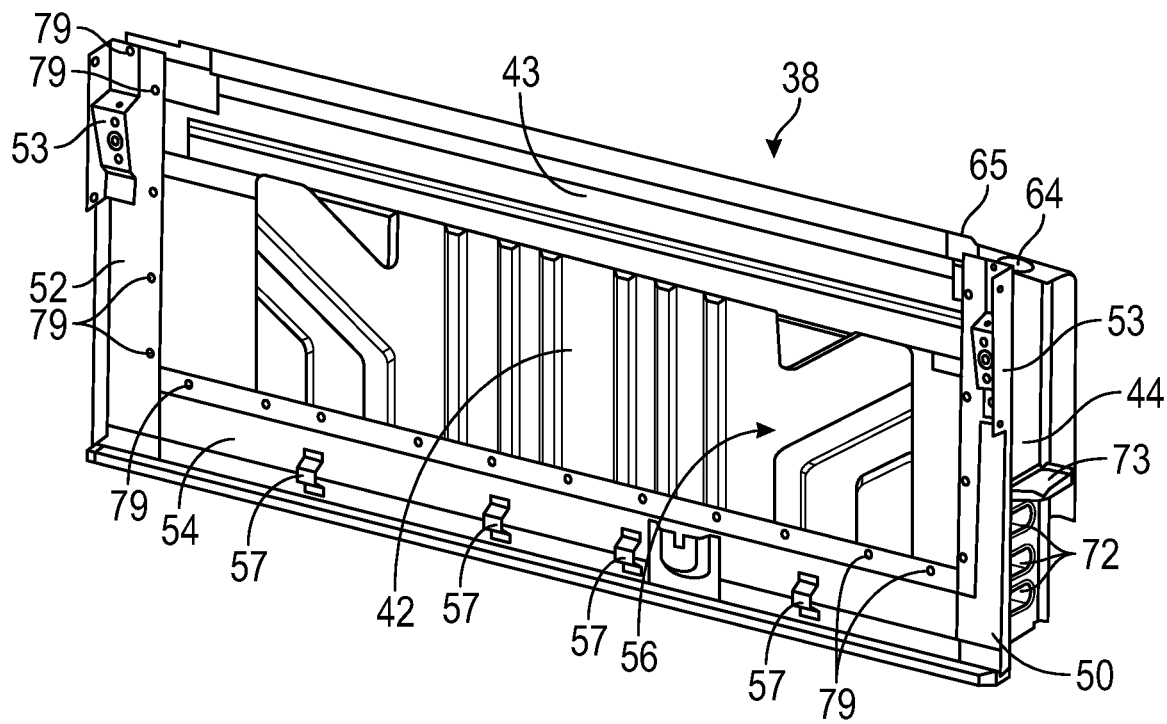
FIG. 4 is a perspective front view of a forward-opening receptacle included in the partition.

As discussed herein, the modular assembly 40 portion of the partition 34 is secured to the receptacle 38 from a single direction (from the front), with some components of the modular assembly 40 then being housed in the cavity 56. As shown in FIG. 4, bottom seat mounts 57 are secured to the mount 54. The mount 54 functions as a brace by directing seat loads applied to the seat mounts 57 to the side mounts 50, 52 and then to the side bodies 14, 16 via the brackets 53.

Figure 2:
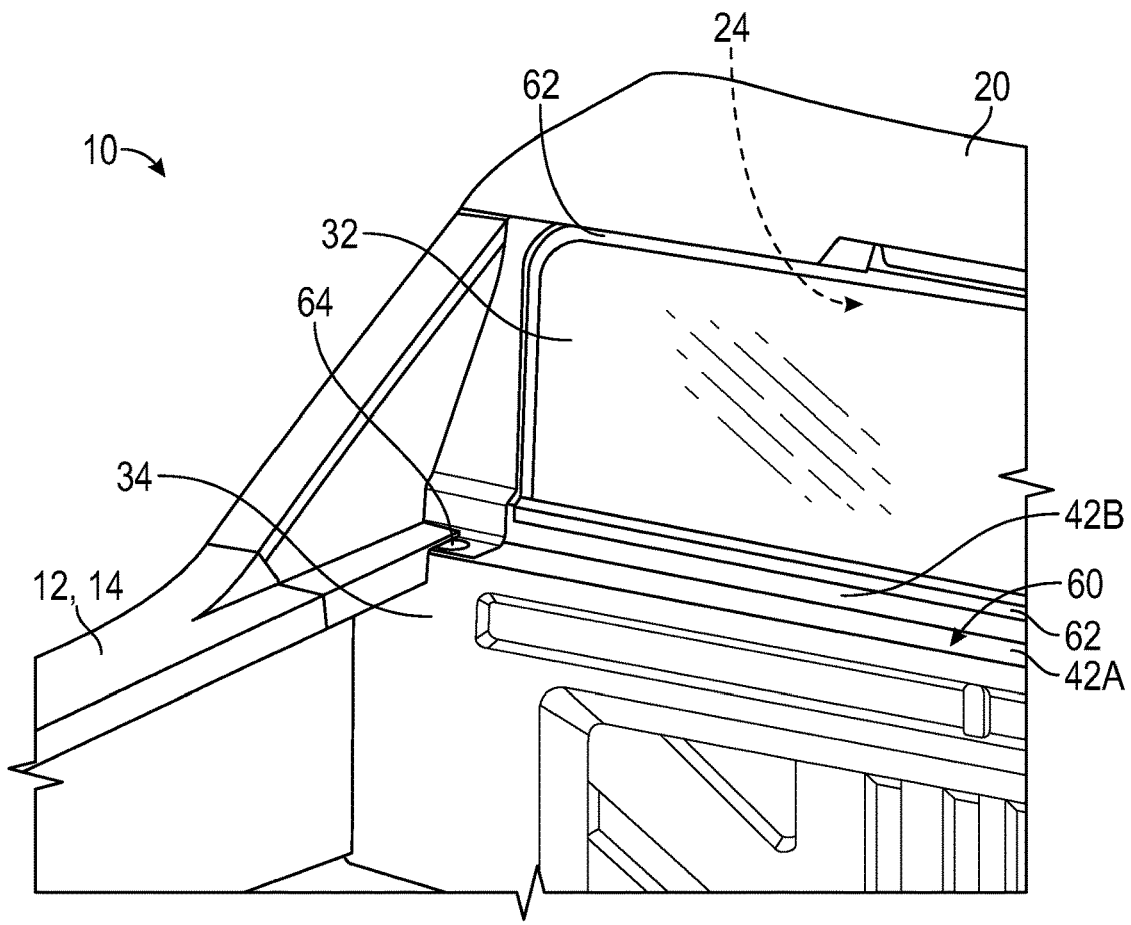
FIG. 2 is a fragmentary perspective rear view of a portion of the vehicle of FIG. 1 with the tonneau cover removed and showing a rear of a partition dividing a cabin space from a bed space.
Figure 12:
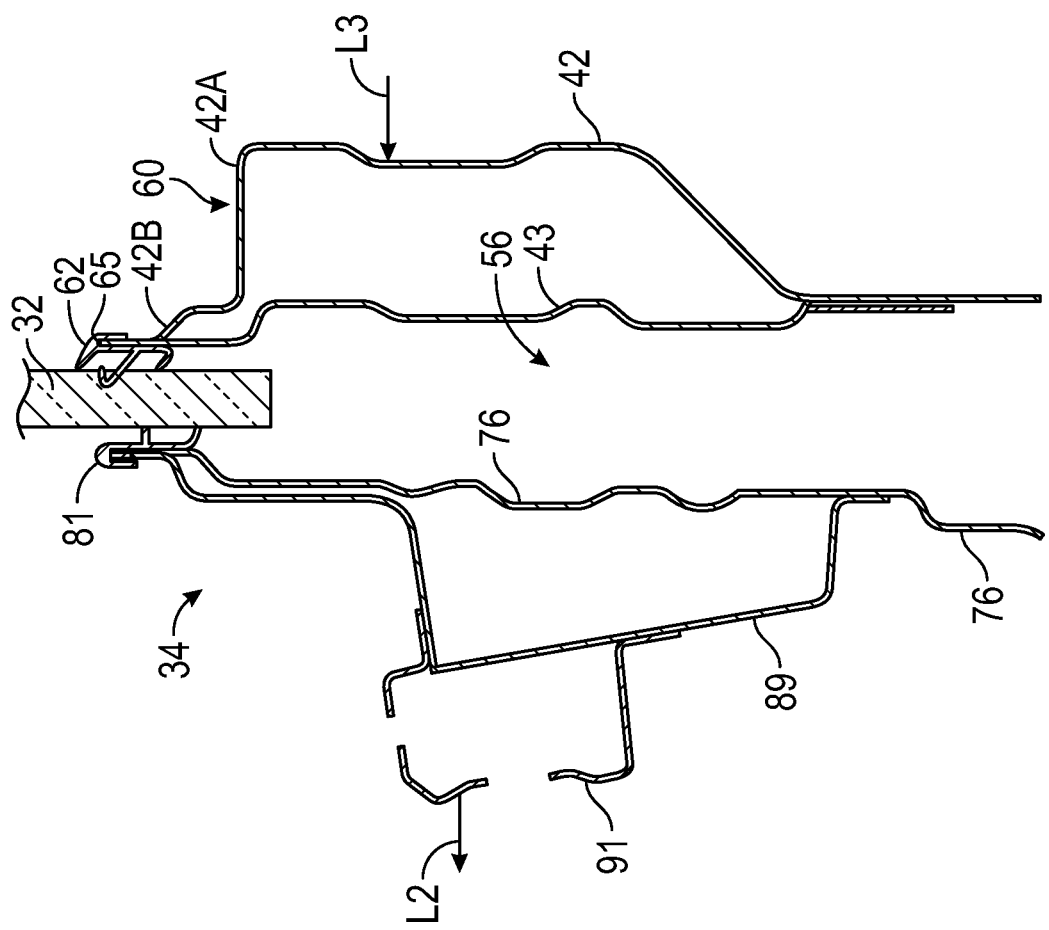
FIG. 12 is a close-up view of a portion of the cross-section of FIG. 11.

As best seen in FIGS. 2, 3, and 12, a forward flange extends forward from the rear panel 42 partially over the first side panel 44, the second side panel 46, and the cavity 56, forming a top wall 42A. The top wall 42A may also be referred to herein as a forward flange. The top wall 42A forms a support surface 60 for the tonneau cover 23. The rear panel 42 also forms a step 42B rising upward and forward from the top wall 42A. The partition 34 includes a window seal 62 secured to an upper edge 65 of the rear panel 42 above the step 42B as best shown in FIG. 12. The window seal 62 extends around and seals a periphery of the glass 32 as shown in FIG. 2. By providing the step 42B above the support surface 60, the seal 62 is not exposed to water draining off of the tonneau cover 23.

Figure 6:
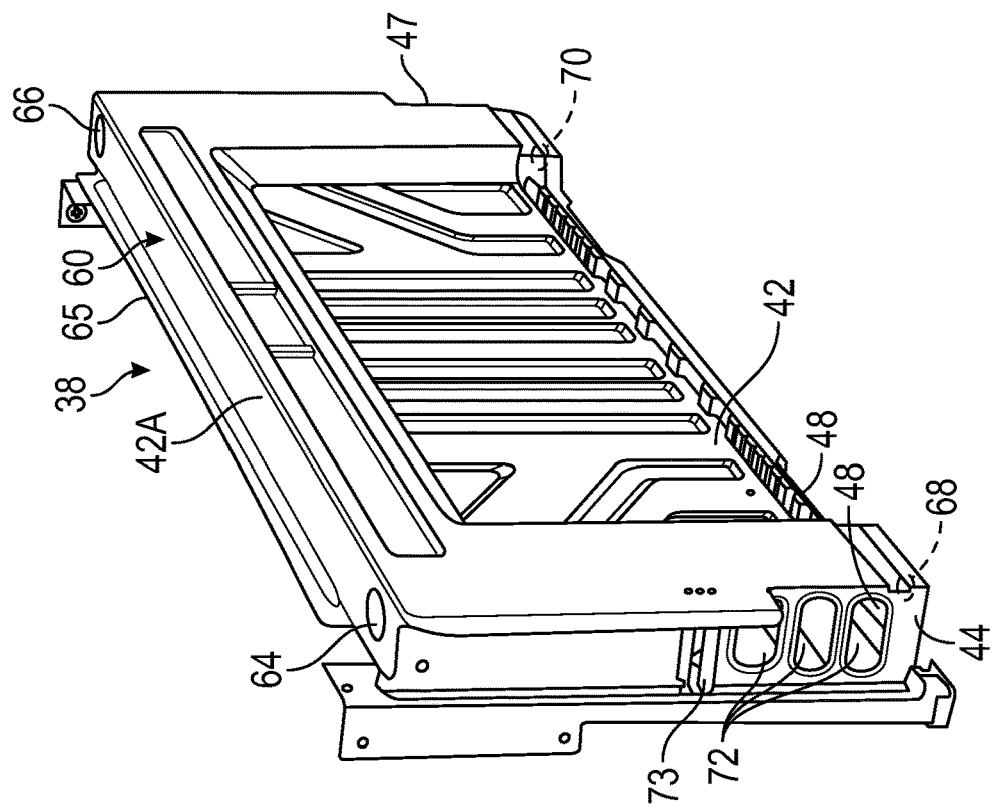
FIG. 6 is a perspective rear view of the forward-opening receptacle portion of the partition.

To further manage water in the bed space 22, such as water draining off of the tonneau cover 23, the top wall 42A has a first drain opening 64 adjacent to and inward of the first side panel 44 and a second drain opening 66 adjacent to and inward of the second side panel 46, as best shown in FIGS. 3 and 6. The bottom panel 48 includes a drain opening 68 disposed generally directly below the drain opening 64, and another drain opening 70 disposed generally directly below the drain opening 66. The side panels 44, 46 each include at least one opening 72 nearer to the bottom panel 48 than to the top wall 42A. In the embodiment shown, each side panel 44, 46 has three openings 72. Water entering the cavity 56 forward of the rear panel 42 (e.g., such as through drain openings 64, 66 or through pressure vent valves 84 discussed herein) can exit the cavity 56 through the openings 68, 70 and 72. As further explained herein, these openings 68, 70 and 72 are disposed at or below the level of wheel wells 94 formed by the side bodies 14, 16 when the partition 34 is fully installed on the vehicle 10. In this way, body cavities 96 above the wheel wells 94 are protected from water draining from the openings 68, 70, and 72. The side bodies 14, 16 are disposed directly outward of and also forward of the openings 64, 66, as best illustrated with respect to opening 64 in FIG. 2, creating blocking walls that help to pool water above the openings 64, 66, directing it along a flow path through the openings 64, 66 and out through the bottom openings 68, 70 or side openings 72. As shown in FIG. 4, a shield 73 extends from the first side panel 44 over the openings 72 to prevent exiting water from rising above the openings 72. A similar shield 73 extends from the second side panel 46 over the openings 72 in the second side panel 46.

Referring to FIGS. 4 and 12, a rear brace 43 extends transversely across the front face of the rear panel 42 and is secured to the side mounts 50, 52 which are in turn secured to the side bodies 14, 16 via the brackets 53 and/or by welding so that the rear brace 43 is operatively connected to and directs loads on the rear panel 42 laterally outward to the side bodies 14, 16. For example, loads from the tonneau cover 23 on the rear panel 42 are directed to and partially borne by the side bodies 14, 16. In this manner, the loads are diverted away from a direction toward the cavity 56, protecting the drop glass window 32 and other components therein.

Figure 5:
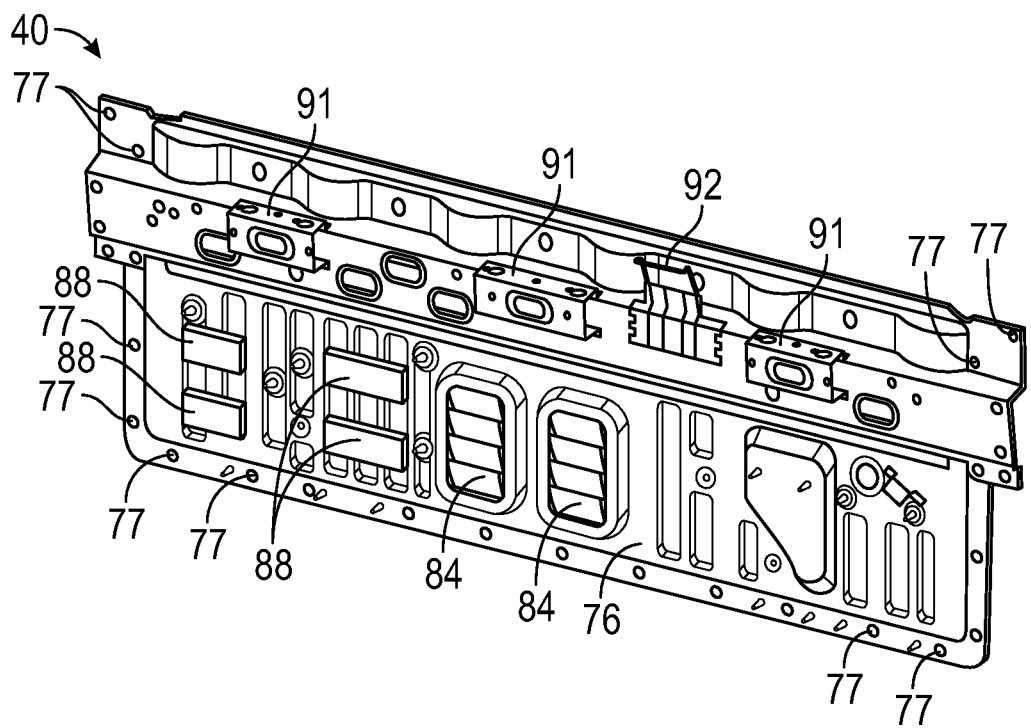
FIG. 5 is a perspective front view of a modular assembly included in the partition.
Figure 9:
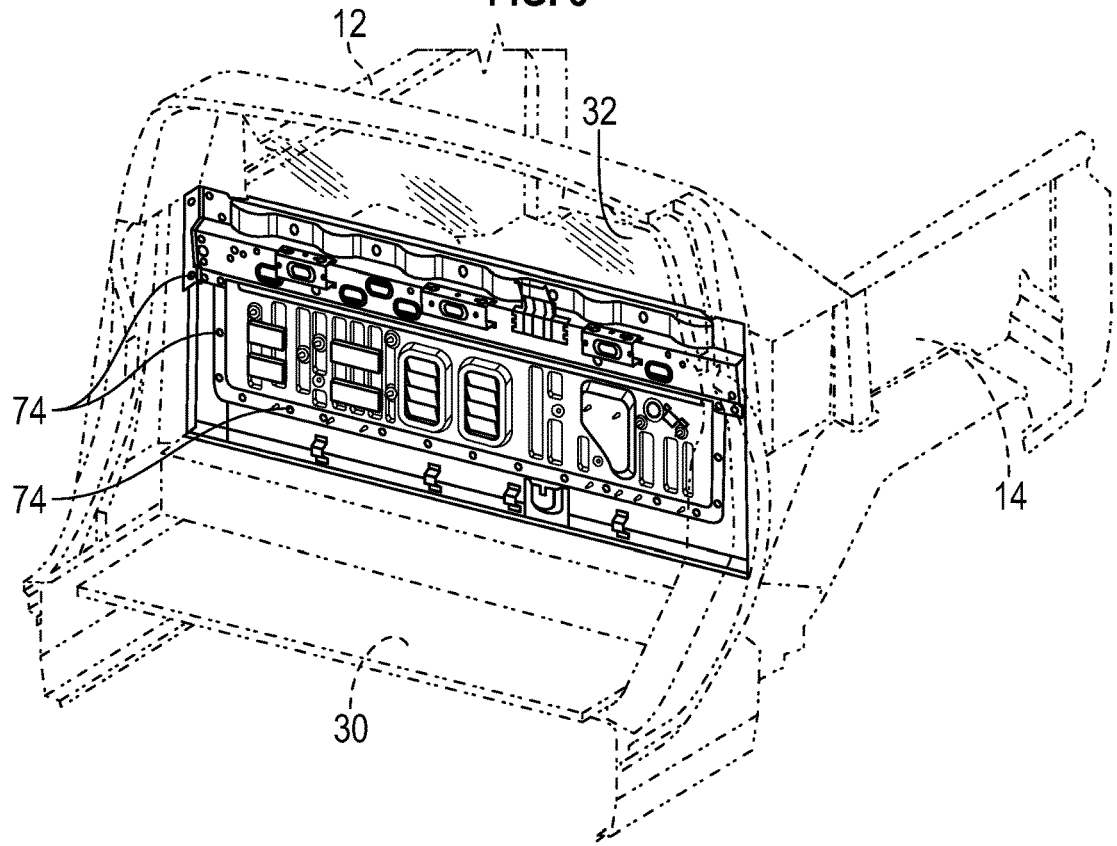
FIG. 9 is a perspective front view of the portion of the vehicle of FIG. 1 showing the modular assembly secured as a unit to the forward-opening receptacle of the partition with the vehicle body shown in phantom.

In addition to the receptacle 38, the partition 34 also includes a modular assembly 40 securable as a unit to a forward side of the receptacle 38, such as with bolts 74 shown in FIG. 9 (only some of the bolts 74 are labelled with reference numbers in FIG. 9 for clarity in the drawings). The bolts 74 extend through openings 77 in the modular assembly 40 that are spaced in the same arrangement as openings 79 in the receptacle 38 for alignment therewith, as is apparent in FIGS. 4 and 5. Only some of the openings 77, 79 are indicated with reference numbers in FIGS. 4 and 5. The forward side of the receptacle 38 to which the modular assembly 40 is secured is the front face of the side and bottom mounts 50, 52, 54.

Referring to FIG. 3, the modular assembly 40 includes a front panel 76 and the drop glass window 32. The drop glass window 32 is translatably supported on guides 78 of a window regulator assembly that also includes a motor 80 and cables 82 (shown schematically in FIG. 3). Translatably supported means that the drop glass window 32 is supported by the modular assembly 40, and is translatable in up and down directions relative to the front panel 76, for example. The guides 78 and motor 80 may be secured to the back side of the front panel 76 when the modular assembly 40 is fully assembled as a unit ready for assembly to the receptacle 38 so that the drop glass window 32 and the window regulator components will be disposed between the front panel 76 and the rear panel 42 in the installed partition 34.

Figure 11:
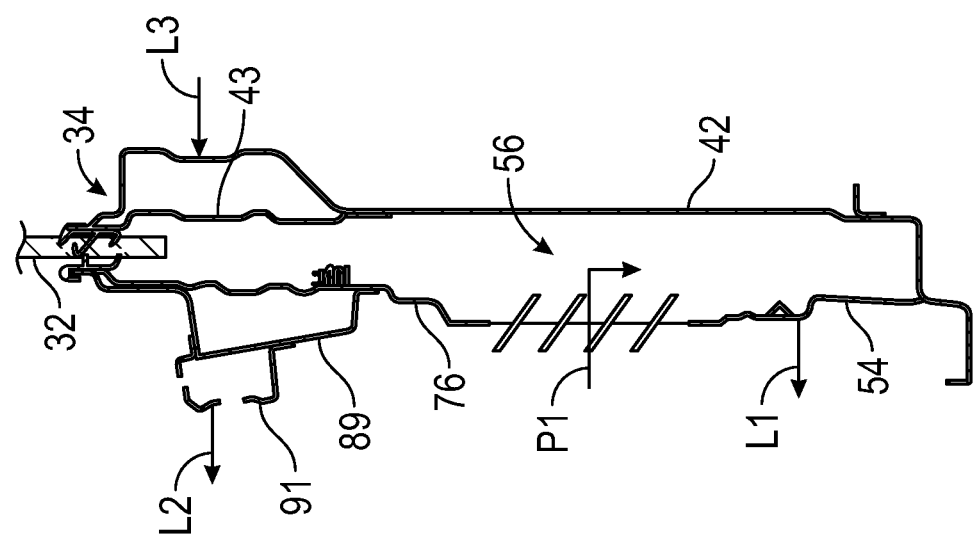
FIG. 11 is a cross-sectional view of the partition, taken at lines 11-11 in FIG. 7.

In addition, the modular assembly 40 may include one or more pressure relief valves 84 mounted to the front panel 76. The relief valves 84 are shown schematically in FIGS. 5, 7 and 11, mounted at apertures 86 in the front panel 76 that are best shown in FIG. 3. The pressure relief valves 84 may be flexible vent flaps (e.g., rubber flaps) configured to lift to vent the cabin space 24 under sufficient air pressure in the cabin space 24. The pressure relief valves 84 are configured to vent pressure from the cabin space 24 through the front panel 76 to the cavity 56 when the modular assembly 40 is secured to the receptacle 38. FIG. 11 shows one of the relief valves 84 as well as a vent path P1 from the cabin space 24 through the pressure relief valve 84 and the cavity 56 in the partition 34 and out through one or more of the openings 68, 70, or 72 discussed herein. The partition 34 thus functions as a wet-dry transition zone, by creating transverse barriers via the panels 42, 76 that largely block water passage from the bed space 22 to the cabin space 24, while allowing venting of the cabin space 24, and draining of pooled water on the rear panel 42.

The modular assembly 40 may also include at least one electronic module 88 mounted to the front panel 76. Four electronic modules 88 are shown mounted to the front panel 76 in FIGS. 5 and 7. The electronic modules 88 may control various electronic features of the vehicle, such as lighting, doors, etc.

Figure 7:
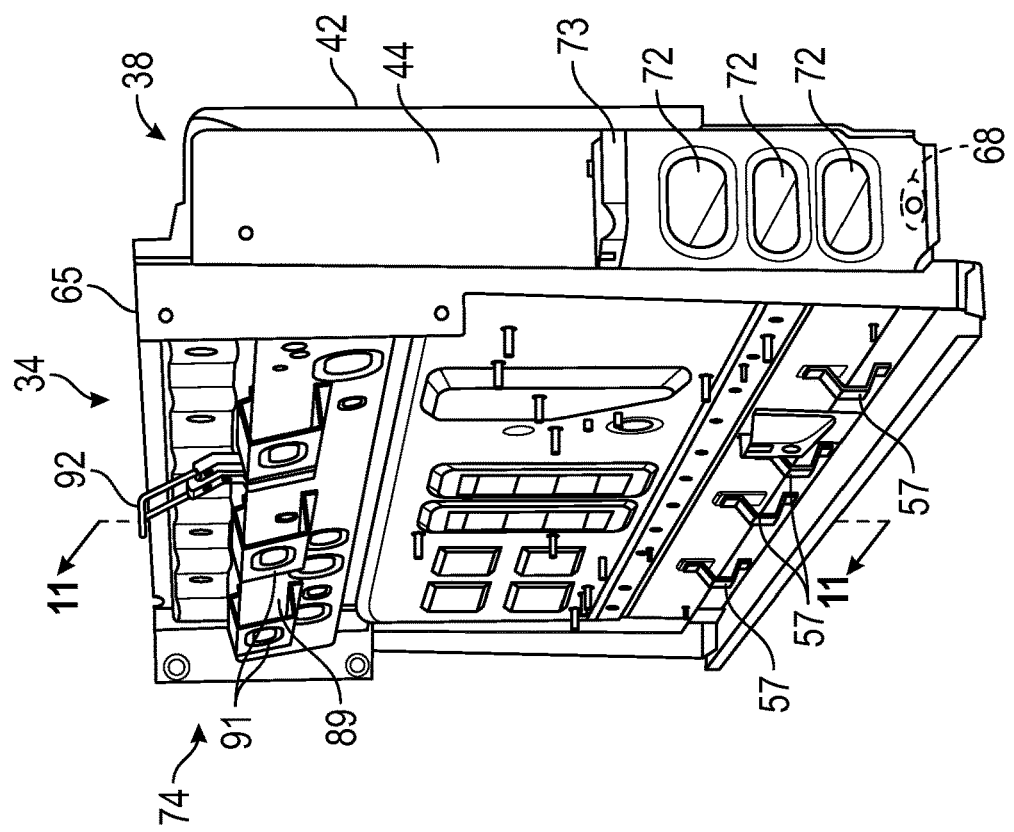
FIG. 7 is a perspective front view of the partition.

Seat mounting structure may also be included in the modular assembly 40. For example, a reinforcement panel 89 having a non-planar cross section forming a horizontal rib (shown in FIGS. 7 and 12) extends transversely across the front panel 76 near the top of the front panel and secures to the brackets 53 of the receptacle 38. Upper seat mounts 91, as well as a seat latch 92 are secured to the front of the reinforcement panel 89 as illustrated in FIG. 7. As shown in FIG. 12, a portion of the front panel 76 extends behind the reinforcement panel 89. The reinforcement panel 89 and the front panel 76 together function as a brace to transfer loads on the reinforcement panel 89 laterally outward to the side bodies 14, 16 instead of inward toward the cavity 56. A seal 81 may extend along joined upper edges of the front panel 76 and reinforcement panel 89 as shown in FIG. 12. The drop glass window 32 translates up and down between the panels 76, 42 in the cavity 56 and is protected along its exit space between the two seals 62, 81.

Accordingly, with reference to FIG. 11, the lower mount 54 disperses seat loads L1 (see FIG. 11) on the seat mounts 57 to the side bodies 14, 16. The reinforcement panel 89 and the front panel 76 behind it form a box-like cross section to function as a beam to disperse upper seat loads L2 (see FIG. 11) to the side bodies 14, 16. The rear panel 42 and the rear brace 43 form a box-like cross section that functions as a beam to disperse the tonneau loads L3 (see FIG. 11) or other loads originating in the bed space 22 to the side bodies 14, 16. Components disposed between the panels 42, 76, such as the drop glass 32, are thus protected from such loads.

Figure 10:
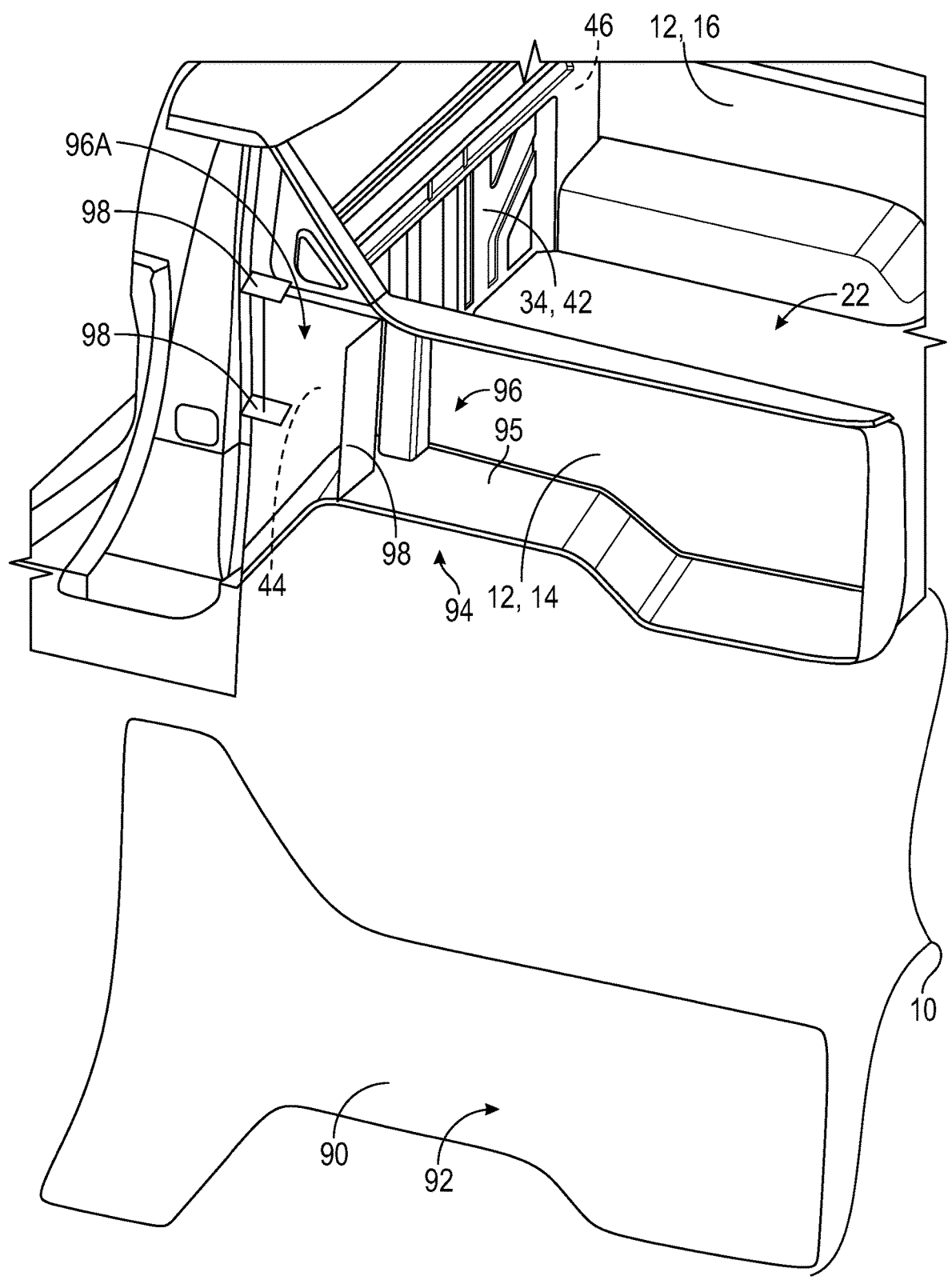
FIG. 10 is a fragmentary perspective side view of the vehicle of FIG. 1 and showing an outer body panel to be secured to the vehicle side body.

The vehicle 10 also creates a wet-dry transition zone outward of the vehicle side bodies 14, 16, in a cavity 96 defined between each side body and a respective exterior panel 90. The exterior panel 90 shown in FIG. 10 presents a Class A exterior surface of the vehicle 10 and is configured to be secured to and disposed outward of the first side body 14. The first side body 14 forms a wheel housing 95 extending outward of the first side panel 44 of the installed partition 34. The wheel housing 95 defines a first wheel well 94. The general location of the first side panel 44 is indicated in FIG. 10. The second side body 16 also forms a wheel housing 95 extending outward of the second side panel 46 of the partition 34 that defines a second wheel well 94. The general location of the second side panel 46 is indicated in FIG. 1. The openings 72 of the side panels 44, 46 are disposed below (lower than) the first and second wheel housings 95 when the partition 34 is installed on the vehicle 10. The drain openings 68, 70 in the bottom panel 48 are also disposed below the wheel housings 95. Accordingly, the wheel housings 95 will shield water draining through the openings 68, 70 and/or 72, preventing it from blowing or splashing upward into the outer cavity 96. FIG. 10 shows a forward portion 96A of the outer cavity 96 generally directly laterally outward of the partition 34. At least one baffle 98 is disposed in the forward portion 96A of the outer cavity 96 over the first wheel housing 95 to further block water from entering the outer cavity 96, and specifically the forward portion 96A of the outer cavity 96. In one example, the baffles 98 may be heat expanding foam baffles that are installed prior to securing the exterior panels 90 to the side bodies 14, 16 and that expand to fill or partially fill the outer cavity 96, such as via heat absorbed during the vehicle painting process.

Figure 13A:
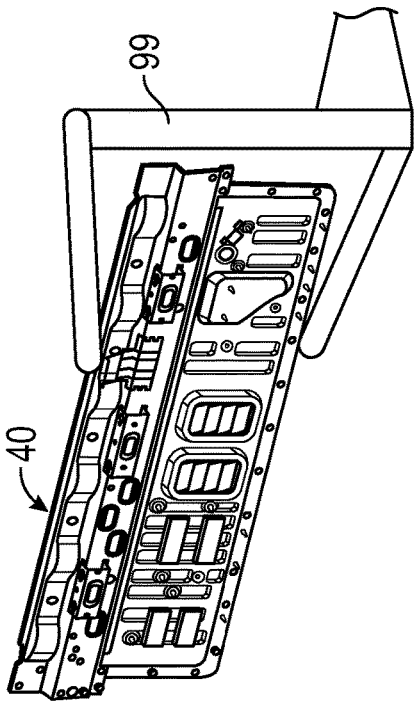
FIG. 13A is a schematic illustration of a step of a method of manufacturing the vehicle of FIG. 1.
Figure 13B:
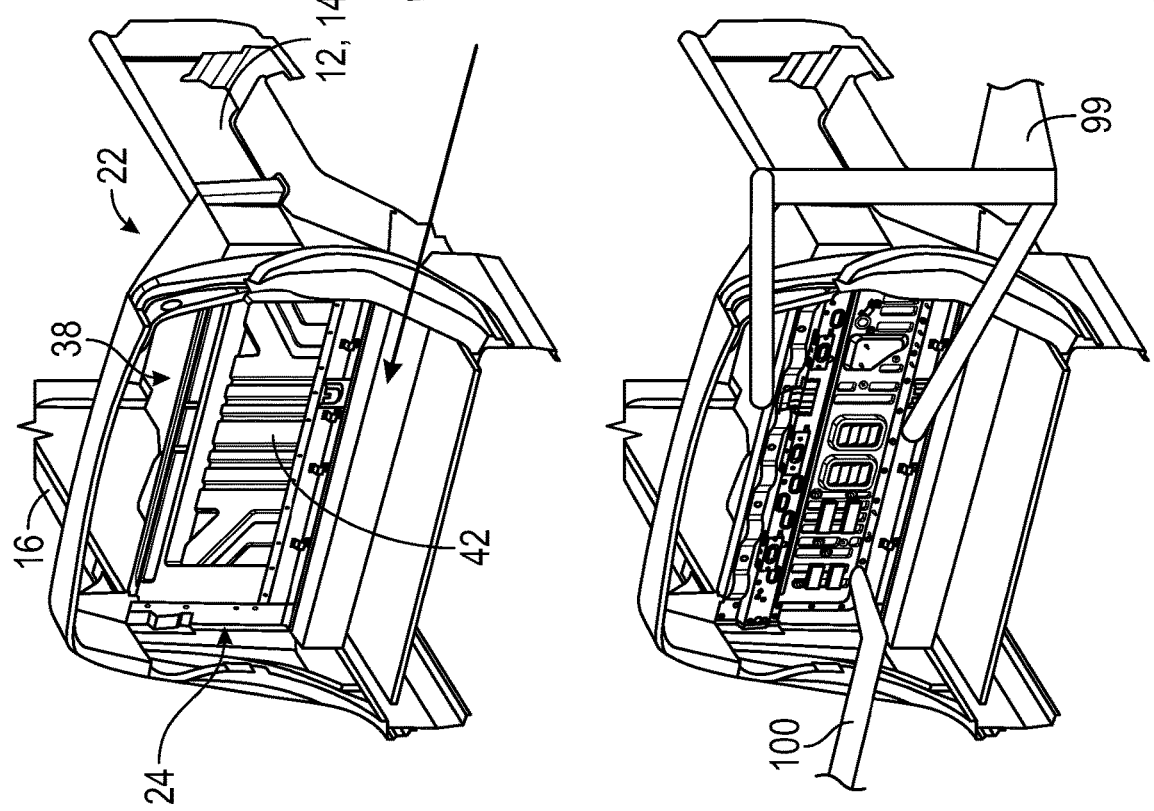
FIG. 13B is a schematic illustration of another step of the method of manufacturing the vehicle of FIG. 1.

FIGS. 13A-13B illustrate a method of assembling the partition 34 in the vehicle 10. As discussed, the forward-opening receptacle 38 is first fixed to the vehicle side bodies 14, 16 such as by bolting or welding the receptacle 38 to the side bodies 14, 16 to separate and extend between the cabin space 24 and the bed space 22. The modular assembly 40 is fully assembled as a unit in an "off" vehicle process prior to installation on the vehicle 10. For example, the one or more pressure relief valves 84, the one or more electronic modules 88, the seat mounts 57, 91, the latch 92, and the drop glass window 32 and regulator components (guides 78, motor 80, and cables 82) are secured to the front panel 76 prior to securing the modular assembly 40 as a unit to the receptacle 38. In FIGS. 13A and 13B, the drop glass window 32 is fully retracted for protection during assembly.

After the forward-opening receptacle 38 is fixed to the side bodies 14, 16, the method includes moving the modular assembly 40 into the cabin space 24 forward of the receptacle 38 while supporting the modular assembly 40 from outside of the vehicle 10. For example, one or more robotic arms 99 may move the modular assembly 40 from outside of the vehicle 10 into the cabin space 24 forward of the receptacle 38. No human needs to be in the cabin space 24 or in the bed space 22 when the method is carried out. For example, the modular assembly 40 may then be secured as a unit to the receptacle 38 from outside of the vehicle 10, such as with another robotic arm 100 bolting the modular assembly 40 to the receptacle 38, as depicted in FIGS. 13A-13B. The bolt openings 77 of the modular assembly 40 and the bolt openings 79 of the receptacle 38 are alignable so that the modular assembly 40 can be secured with bolts 74 extending through the openings 77, 79 from the front of the modular assembly 40. When the partition 34 is fully installed in the vehicle 10, the drop glass window 32 is translatably supported by the modular assembly 40 between the front panel 76 and the rear panel 42.

After the partition 34 is fully installed, the exterior panels 90 (one shown in FIG. 10) are secured to the first side body 14 and to the second side body 16 to define the outer cavities 96. One or more baffles 98 may be disposed in the outer cavities 96 over the wheel housings 95 prior to securing the exterior panels 90 to the side bodies 14, 16 to block water from entering the outer cavity 96.

Accordingly, the unique configuration of the partition 34 including the forward-opening receptacle 38 and the modular assembly 40 installable as a unit enables installation of the modular assembly 40 from the exterior to the vehicle 10, cabin space venting, load management to protect the drop glass window 32, and provides wet-dry transition and other water management features.

While the best modes for carrying out the disclosure have been described in detail, those familiar with the art to which this disclosure relates will recognize various alternative designs and embodiments for practicing the disclosure within the scope of the appended claims.

What is claimed is:

1. A vehicle comprising:
   a vehicle body defining a cabin space and a bed space, the vehicle body having a first side body and an opposing second side body spaced apart from the first side body, the first side body and the second side body defining opposing sides of the cabin space and the bed space; and
   a partition extending transversely across the vehicle from the first side body to the second side body between the cabin space and the bed space, the partition including:
      a forward-opening receptacle fixed to and spanning between the first side body and the second side body and including a rear panel; and
      a modular assembly secured as a unit to a forward side of the receptacle, the modular assembly including a front panel and a window glass translatably supported by the modular assembly between the front panel and the rear panel;
   wherein the receptacle includes a first side panel extending forward from the rear panel, a second side panel extending forward from the rear panel, and a top wall extending forward from the rear panel over the first side panel and the second side panel, the top wall having a first drain opening adjacent to and inward of the first side panel and a second drain opening adjacent to and inward of the second side panel.

2. The vehicle of claim 1, wherein:
   the first side body defines a first wheel well outward of the first side panel and the second side body defines a second wheel well outward of the second side panel; and
   the first side panel and the second side panel each including an opening disposed below the first wheel well.

3. The vehicle of claim 2, further including:
   an exterior panel disposed outward of and secured to the first side body, the first side body, the first side panel, and the exterior panel defining an outer cavity; and
   at least one baffle disposed in the outer cavity over the first wheel well to block water from entering the outer cavity.

4. The vehicle of claim 1, wherein the receptacle includes a bottom wall extending forward from the rear panel, and wherein the bottom wall includes a drain opening.

5. The vehicle of claim 1, further comprising:
   a pressure relief valve mounted to the front panel and configured to vent pressure from the cabin space through the front panel.

6. The vehicle of claim 1, further comprising:
   at least one electronic module mounted to the front panel.

7. The vehicle of claim 1, wherein the top wall forms a support surface for a tonneau cover and a step rising upward from the top wall; and the partition further comprising:
   a window seal secured to an upper edge of the rear panel above the step.

8. The vehicle of claim 1, further comprising:
   a forward brace extending transversely across the front panel and secured to the first side body and to the second side body; and
   a rear brace extending transversely across the rear panel and secured to the first side body and the second side body; wherein the forward brace directs loads on the front panel to the first side body and the second side body, and the rear brace directs loads on the rear panel to the first side body and the second side body.

9. A partition for separating a cabin space from a bed space on a vehicle having a first side body and a second side body, the partition comprising:
   a forward-opening receptacle fixable to the first side body and to the second side body to span between the first side body and the second side body and including a rear panel; and
   a modular assembly securable as a unit to a forward side of the receptacle, the modular assembly including a front panel and a window glass configured to be translatably supported by the modular assembly between the front panel and the rear panel;
   wherein the receptacle includes a first side panel extending forward from the rear panel, a second side panel extending forward from the rear panel, and a top wall extending forward from the rear panel over the first side panel and the second side panel, the top wall having a first drain opening adjacent to and inward of the first side panel and a second drain opening adjacent to and inward of the second side panel.

10. The partition of claim 9, wherein:
    the first side body includes a first wheel well extending outward of the first side panel and a second wheel well extending outward of the second side panel; and
    the first side panel and the second side panel each include an opening configured to be disposed below the first wheel well and the second wheel well, respectively, when the forward-opening receptacle is fixed to the first side body and to the second side body and the modular assembly is secured to the forward side of the receptacle.

11. The partition of claim 10, wherein the receptacle includes a bottom wall extending forward from the rear panel, and wherein the bottom wall includes a drain opening.

12. The partition of claim 9, further comprising:
    a pressure relief valve mounted to the front panel and configured to vent pressure from the cabin space through the front panel when the forward-opening receptacle is fixed to the first side body and to the second side body and the modular assembly is secured to the forward side of the receptacle.

13. The partition of claim 9, further comprising:
    at least one electronic module mounted to the front panel.

14. The partition of claim 9, wherein the top wall forms a support surface for a tonneau cover and a step rising upward from the top wall; and the partition further comprising:

a window seal secured to an upper edge of the rear panel above the step.

15. The partition of claim 9, further comprising:

a forward brace extending transversely across the front panel and configured to be secured to the first side body and to the second side body; and a rear brace extending transversely across the rear panel and configured to be secured to the first side body and the second side body; wherein the forward brace directs loads on the front panel to the first side body and the second side body, and the rear brace directs loads on the rear panel to the first side body and the second side body.

16. A method of manufacturing a vehicle, the method comprising:

fixing a forward-opening receptacle to a first side body and to a second side body between a cabin space and a bed space, the forward-opening receptacle including a rear panel;

moving a modular assembly into the cabin space forward of the receptacle while supporting the modular assembly from outside of the vehicle; and securing the modular assembly as a unit to the receptacle from outside of the vehicle, the modular assembly including a front panel and a window glass configured to be translatably supported by the modular assembly between the front panel and the rear panel, the receptacle and the modular assembly together serving as a partition between the cabin space and the bed space;

wherein the receptacle includes a first side panel extending forward from the rear panel, a second side panel extending forward from the rear panel, and a top wall extending forward from the rear panel over the first side panel and the second side panel, the top wall having a first drain opening adjacent to and inward of the first side panel and a second drain opening adjacent to and inward of the second side panel;

wherein the first side body includes a first wheel well extending outward of the first side panel and a second wheel well extending outward of the second side panel;

wherein the first side panel and the second side panel each include an opening configured to be disposed below the first wheel well and the second wheel well, respectively, when the forward-opening receptacle is fixed to the first side body and to the second side body and the modular assembly is secured to the receptacle; and the method further comprising:

securing an exterior panel to the first side body outward of the first side body, the first side body, the first side panel, and the exterior panel defining an outer cavity; and disposing at least one baffle in the outer cavity over the first wheel well to block water from entering the outer cavity.

17. The method of claim 16, further comprising:

mounting at least one of a pressure relief valve and an electric module to the front panel prior to securing the modular assembly as a unit to the receptacle from outside of the vehicle.

* * * * *